United States Patent [19]
Rothove

[11] Patent Number: 5,626,514
[45] Date of Patent: May 6, 1997

[54] SMALL GAME SKINNING DEVICE

[76] Inventor: Herman H. Rothove, HCR 65 Box 13, Westphalia, Mo. 65085

[21] Appl. No.: 617,643

[22] Filed: Mar. 19, 1996

[51] Int. Cl.$^6$ ............................................. A27B 5/16
[52] U.S. Cl. ................................ 452/128; 452/187
[58] Field of Search ........................ 452/128, 125, 452/187

[56] References Cited

U.S. PATENT DOCUMENTS

| | | | |
|---|---|---|---|
| 5,100,365 | 3/1992 | Johnson | 452/187 |
| 5,211,601 | 5/1993 | Cope | 452/128 |
| 5,395,284 | 3/1995 | Frisk | 452/187 |

FOREIGN PATENT DOCUMENTS 0229399  7/1990  European Pat. Off. .

*Primary Examiner*—Willis Little

[57] ABSTRACT

A small game skinning device including an elongated frame tubing that has a first end and a second end. A short frame tubing that is L-shaped. The short frame tubing has an upper end and a back end that is positioned over the first end of the elongated frame tubing. Included is a ratcheting mechanism with a spool. The ratcheting mechanism and spool are both supported above the second end of the elongated frame tubing by a pair of support arms, and an axial rod. The spool has a drum that has a heavy-duty cord wound therearound. Lastly, a pair of claws forming a first claw and a second claw are included. The first claw is positioned through an upper end of the short frame tubing by a threaded rod fixedly attached thereto. The second claw has an eyelet that receives one end of the cord. The cord has another end that is wrapped around the spool. The first claw is hooked onto a part of a small animal, while the second claw grapples with the animal's back skin. The back skin is pulled away from the animal by pulling the second claw toward the second end of the elongated framing tube, with the ratcheting mechanism.

9 Claims, 3 Drawing Sheets

SMALL GAME SKINNING DEVICE

BACKGROUND OF THE INVENTION

1. Field of the Invention

The present invention relates to a small game skinning device and more particularly pertains to removing an animal's back skin by using a pair of claw hooks in association with a frame, with one hook being attached to a ratcheting mechanism for pulling the skin away from the animal.

2. Description of the Prior Art

The use of an animal skinning device is known in the prior art. More specifically, an animal skinning devices heretofore devised and utilized for the purpose of skinning animals are known to consist basically of familiar, expected, and obvious structural configurations, notwithstanding the myriad of designs encompassed by the crowded prior art which has been developed for the fulfillment of countless objectives and requirements.

By way of example, U.S. Pat. Des. No. 315,092 to Brown discloses an adjustable hanger for skinning animals by taxidermists and the like. U.S. Pat. No. 4,856,143 to Callsen and Munss discloses an apparatus for skinning poultry carcasses. U.S. Pat. No. 4,782,455 to Gladney and Baker discloses a squirrel skinning device. U.S. Pat. Des. No. 288,660 to Hudson discloses an animal skinning holder. U.S. Pat. No. 4,625,363 to Watson discloses a squirrel skinning apparatus. Lastly, U.S. Pat. No. 4,425,678 to Pepper discloses a game skinning aid.

While these devices fulfill their respective, particular objectives and requirements, the aforementioned patents do not describe a small game skinning device that allows hunters and taxidermists to easily remove the skin from small game animals through the use of a pair of claw hooks that operate in association with a ratcheting mechanism, with both being attached to a frame.

In this respect, the small game skinning device according to the present invention substantially departs from the conventional concepts and designs of the prior art, and in doing so provides an apparatus primarily developed for the purpose of removing an animal's back skin by using a pair of claw hooks in association with a frame, with one hook being attached to a ratcheting mechanism for pulling the skin away from the animal.

Therefore, it can be appreciated that there exists a continuing need for a new and improved small game skinning device which can be used for removing an animal's back skin by using a pair of claw hooks in association with a frame, with one hook being attached to a ratcheting mechanism for pulling the skin away from the animal. In this regard, the present invention substantially fulfills this need.

SUMMARY OF THE INVENTION

In view of the foregoing disadvantages inherent in the known types of an animal skinning devices now present in the prior art, the present invention provides an improved small game skinning device. As such, the general purpose of the present invention, which will be described subsequently in greater detail, is to provide a new and improved small game skinning device and method which has all the advantages of the prior art and none of the disadvantages.

To attain this, the present invention essentially comprises an elongated frame tubing that has a first end and a second end. The elongated frame tubing has a plurality of mounting ears that allow it to be attached to a work table. The elongated frame tubing has a left side and a right side, with each side having two of the mounting ears positioned thereon. The two mounting ears of the left side are spaced apart. The two mounting ears of the right side are spaced apart. Included is a short frame tubing that is L-shaped. The short frame tubing has an upper end and a back end that is positioned over the first end of the elongated tubing. The short frame tubing is coupled with the elongated frame tubing and capable of extending beyond the work table. A ratcheting mechanism with a spool is provided. The ratcheting mechanism and spool are both supported above the second end of the elongated frame tubing by a pair of support arms and an axial rod. The pair of support arms have a left support arm that is adjacent a ratchet wheel and crank of the ratcheting mechanism. The pair of support arms have a right support arm that is spaced from a large wheel of the spool, and has one end of the axle rod therethrough. The spool has a drum that has a heavy-duty cord wound around. Lastly, a pair of claws are provided. The claws form a first claw and a second claw. Each claw is three pronged with two large outer J-hook members and one small J-hook member. The first claw is fixedly attached to a threaded rod. The threaded rod is positioned through the upper end of the short frame tubing. The threaded rod is locked within the short frame and has the first claw directed toward the ratcheting mechanism. Furthermore, the second claw has an eyelet that receives one end of the cord. The cord is threaded through the eyelet and secured therein by a clamp. The cord has another end that is wrapped around the spool. The first claw is hooked onto a part of a small animal, while the second claw grapples with the animal's back skin. The second claw is pulled toward the second end of the elongated frame tubing by the ratcheting mechanism. The second claw, when pulled toward the second end, is capable of bring the skin of the small animal therewith, while the animal remains hooked onto the first claw.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved small game skinning device which has all of the advantages of the prior art an animal skinning devices and none of the disadvantages.

It is another object of the present invention to provide a new and improved small game skinning device which may be easily and efficiently manufactured and marketed.

It is further object of the present invention to provide a new and improved small game skinning device which is of durable and reliable constructions.

An even further object of the present invention is to provide a new and improved small game skinning device which is susceptible of a low cost of manufacture with regard to both materials and labor, and which accordingly is then susceptible of low prices of sale to the consuming public, thereby making such small game skinning device economically available to the buying public.

Still yet another object of the present invention is to provide a new and improved small game skinning device which provides in the apparatuses and methods of the prior art some of the advantages thereof, while simultaneously overcoming some of the disadvantages normally associated therewith.

Even still another object of the present invention is to provide a small game skinning device for removing an animal's back skin by using a pair of claw hooks in association with a frame, with one hook being attached to a ratcheting mechanism for pulling the skin away from the animal.

Lastly, it is an object of the present invention to provide a new and improved small game skinning device including an elongated frame tubing that has a first end and a second end. A short frame tubing that is L-shaped. The short frame tubing has an upper end and a back end that is positioned over the first end of the elongated frame tubing. Included is a ratcheting mechanism with a spool. The ratcheting mechanism and spool are both supported above the second end of the elongated frame tubing by a pair of support arms, and an axial rod. The spool has a drum that has a heavy-duty cord wound therearound. Lastly, a pair of claws forming a first claw and a second claw are included. The first claw is positioned through an upper end of the short frame tubing by a threaded rod fixedly attached thereto. The second claw has an eyelet that receives one end of the cord. The cord has another end that is wrapped around the spool. The first claw is hooked onto a part of a small animal, while the second claw grapples with the animal's back skin. The back skin is pulled away from the animal by pulling the second claw toward the second end of the elongated framing tube, with the ratcheting mechanism.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
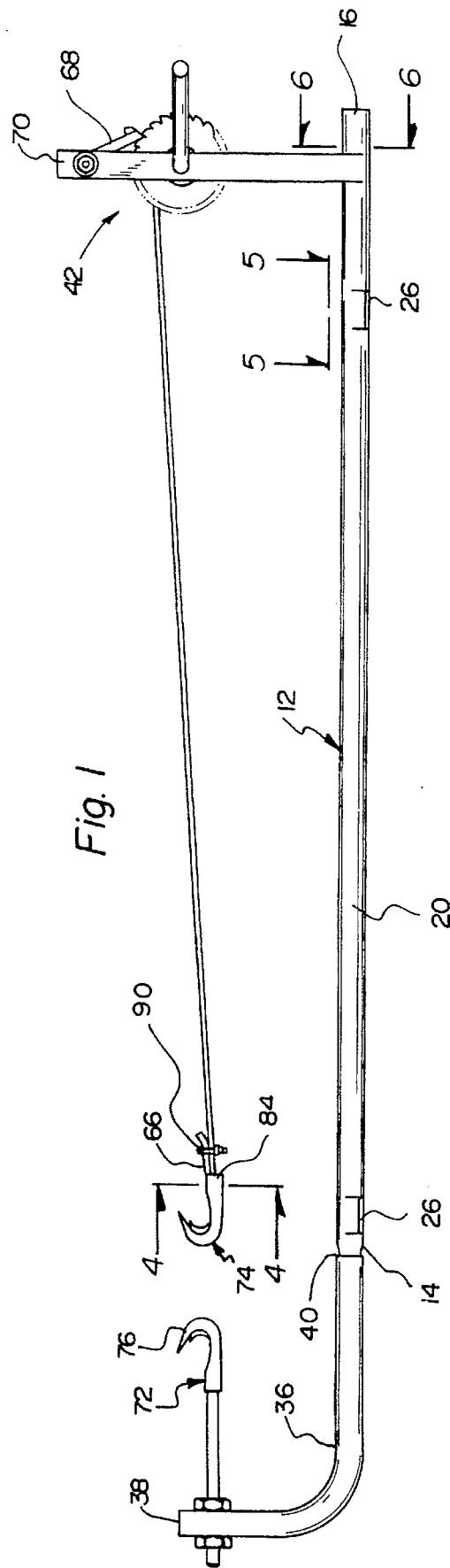
FIG. 1 is a perspective view of the preferred embodiment of the small game skinning device constructed in accordance with the principles of the present invention.

With reference now to the drawings, and in particular to FIG. 1 thereof, the preferred embodiment of the new and improved small game skinning device embodying the principles and concepts of the present invention and generally designated by the reference numeral 10 will be described.

The present invention, the small game skinning device 10 is comprised of a plurality of components. Such components in their broadest context include a frame tubing, a ratcheting mechanism and a pair of claws. Such components are individually configured and correlated with respect to each other so as to attain the desired objective.

Figure 5:
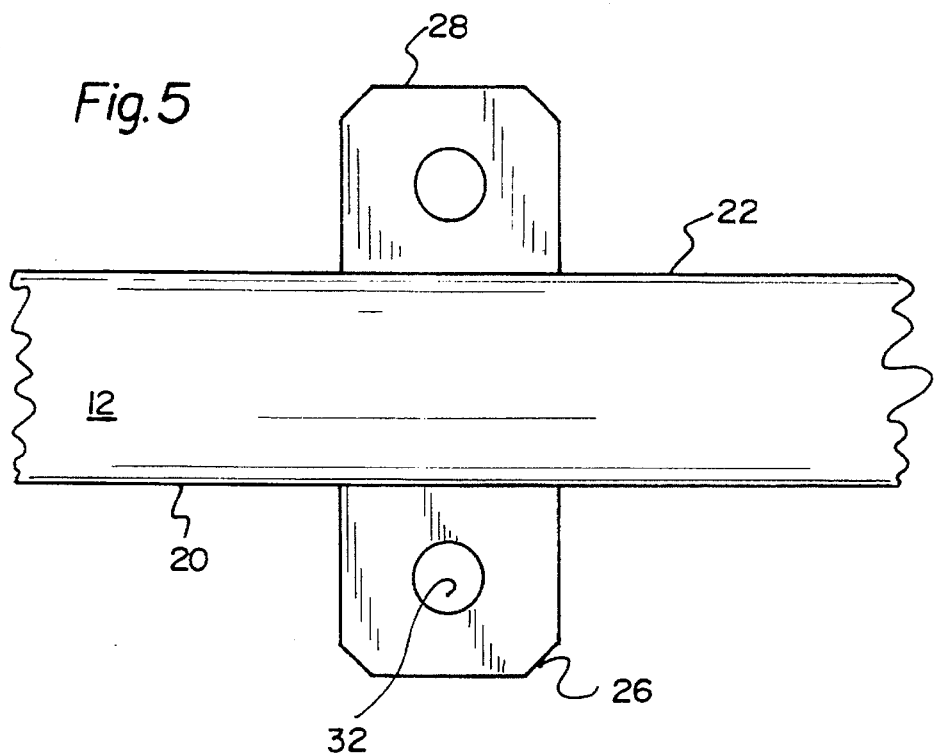
FIG. 5 is a fragmentary view of the frame taken along line 5—5 of FIG. 1.
Figure 6:
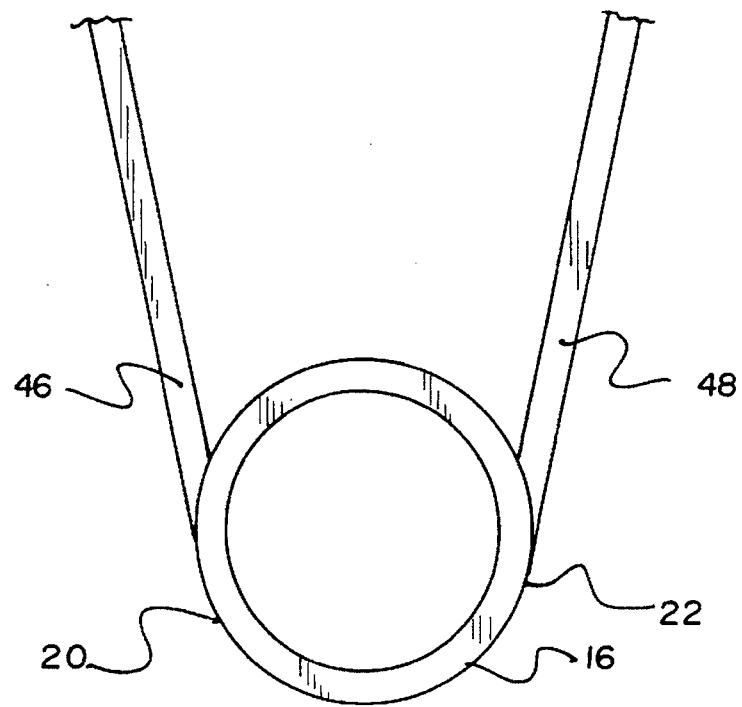
FIG. 6 is a rear view of the present invention taken along line 6—6 of FIG. 1.

Specifically, the present invention includes an elongated frame tubing 12 made of metal or metal alloy. The elongated frame tubing is hollow, as seen in FIG. 6, and has a first end 14 and a second end 16. The elongated frame tubing has a plurality of mounting ears for attaching the tubing to a work table not shown. The elongate frame tubing has a left side 20 and a right side 22, as seen in FIG. 5. Each side has two of the mounting ears 26, 28 positioned thereon. The two mounting ears of the left side 26 are spaced apart, as shown in FIG. 1. One of the left side mounting ears is spaced from the first end, and another of the left side mounting ears is spaced from the second end. The two mounting ears 28 of the right side are spaced apart. One of the right side mounting ears is spaced from the first end, and another of the right side mounting ears is spaced from the second end. Each mounting ear 26, 28 has a generally rectangular shape with a hole 32 therethrough. Each mounting ear is welded to the side of the elongated frame tubing.

Figure 2:
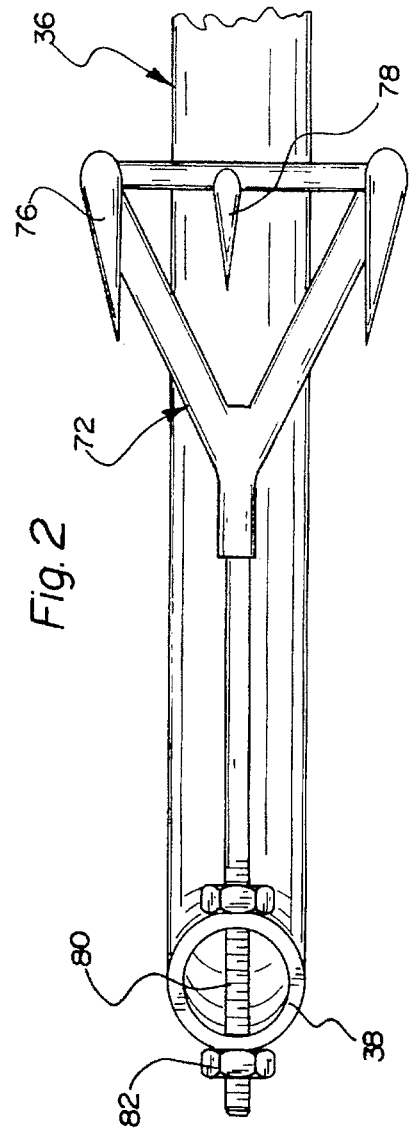
FIG. 2 is a cut-away top plan view of the first claw of the present invention.

Also, a short frame tubing 36 that is L-shaped is provided. The short frame tubing has an upper end 38 and a back end 40, as seen in FIG. 1. FIG. 2 shows that the short frame tubing is hollow and allows the back end to slid over the first end of the elongated frame tubing. The short frame tubing, when coupled with the elongated frame tubing, is capable of extending beyond the work table. The elongated frame tubing and the short frame tubing are capable of releasable coupling for storage of the device.

Figure 3:
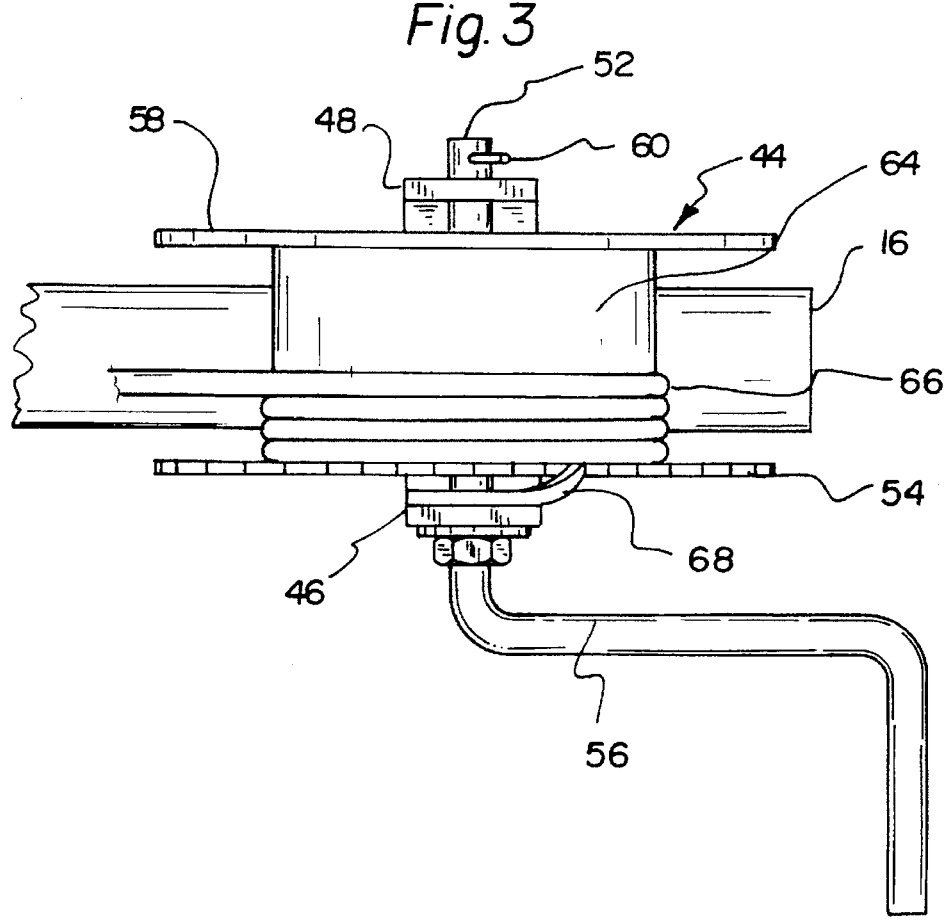
FIG. 3 is a cut-away top plan view of the ratcheting mechanism of the present invention.

As best illustrated in FIG. 3, a ratcheting mechanism 42 with a spool 44 is provided. The ratcheting mechanism and spool are both supported above the second end 16 of the elongated frame tubing by a pair of support arms 46, 48, and an axial rod 52. The pair of support arms have a left support arm 46 that is adjacent a ratchet wheel 54 and crank 56 of the ratcheting mechanism. The pair of support arms have a right support arm 48 that is spaced from a large wheel 58 of the spool and has one end of the axle rod therethrough. The axle rod is locked in position by a locking pin 60. The spool has a drum 64 that has a heavy-duty cord 66 wound therearound. The cord may be wound and unwound around the spool by turning the crank. A pawl 68, at the upper end 70 of the left support arm, will lock the ratcheting wheel. The pawl, as seen in FIG. 1, will hold the ratcheting wheel in place when rewinding the cord.

Lastly, a pair of claws are provided. The pair of claws form a first claw 72 and a second claw 74. Each claw is three pronged with two large outer J-hook members 76 and one small inner J-hook member 78. The first claw is fixedly attached to a threaded rod 80, as seen in FIG. 2. The threaded rod is positioned through the upper end 38 of the short frame tubing 36. The threaded rod is locked within the short frame tubing by a pair of locking nuts 82. The first claw is directed toward the ratcheting mechanism when locked in position by the threaded rod.

Figure 4:
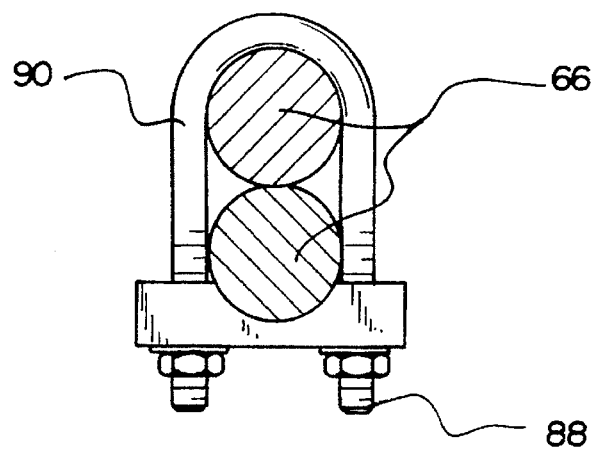
FIG. 4 is a cross sectional view of the cord and eyelet taken along line 4—4 of FIG. 1.

Furthermore, the second claw 74 has an eyelet 84 for receiving one end of the cord 66. The cord is threaded through the eyelet and secured therein by a clamp 90, as seen in FIG. 4. The clamp has a pair of screws that lock the clamp around the one end of the cord, after the cord is looped through the eyelet. The cord has another end that is wrapped around the spool, as seen in FIG. 3. The J-hook members of each claw face upwardly when the claws are coupled to the various components of the frame. The first claw is hooked onto a part of a small animal, while the second claw grapples with the animal's back skin. The second claw is pulled toward the second end of the elongate frame tubing by the ratcheting mechanism. The second claw, when pulled toward the second end, bring the skin of the animal therewith, while the animal remains hooked onto the first claw.

The present invention is an easy to use small game skinning device. The frame portion of the invention may be clamped or screwed onto any work table. The frame portion is two pieces, with one piece being an elongate frame tubing, and the other piece being an L-shaped short frame tubing. The two pieces of the frame tubing may be assembled and disassembled for packaging. Attached to one end of the elongated frame tubing is a spool and ratchet mechanism. The spool and ratchet mechanism include a heavy-duty cord which is coupled to a second of the two claw hook members. A first of the two claw hook members is attached to the short frame tubing with a threaded rod. The present invention is screwed onto a table or work bench for stability. To remove the skin of the animal, simply cut the skin across the animal's back, insert the hooks into the cuts, and turn the spool crank. The skin is drawn off the animal quickly and easily. A ratcheting mechanism prevents the spool from unwinding when the crank is released after having been attached to the animal. The crank assembly may be placed on either side of the pair of support arms that attach it to the elongated frame tubing.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved small game skinning device for removal of an animal's skin prior to dressing comprising in combination:

an elongated frame tubing having a first end and a second end, the elongated frame tubing having a plurality of mounting ears for attaching the tubing to a work table, the elongated frame tubing having a left side and a right side with each side having two of the mounting ears positionable thereon, the two mounting ears of the left side being spaced apart, the two mounting ears of the right side being spaced apart;

a short frame tubing being L-shaped, the short frame tubing having an upper end and a back end being positionable over the first end of the elongated frame tubing, the short frame tubing being coupled with the elongated frame tubing being capable of extending beyond the work table;

a ratcheting mechanism with a spool being supported above the second end of the elongated frame tubing by a pair of support arms and an axial rod, the pair of support arms having a left support arm being adjacent a ratchet wheel and crank of the ratcheting mechanism, the pair of supports arms having a right support arm being spaced from a large wheel of the spool and having one end of the axial rod therethrough, the spool having a drum being capable of having a heavy-duty cord wound therearound;

a pair of claws forming a first claw and a second claw, each claw being three pronged with two large outer J-hook members and one small J-hook member, the first claw being fixedly attached to a threaded rod, the threaded rod being positionable through the upper end of the short frame tubing, the threaded rod being locked within the short frame and having the first claw being directed toward the ratcheting mechanism; and the second claw having an eyelet for receiving one end of the cord therethrough, the cord being threaded through the eyelet and secured therein by a clamp, the cord having another end being wrapped around the spool, the first claw being hooked onto a part of a small animal while the second claw grapples with the animals back skin, the second claw capable of being pulled toward the second end of the elongated frame tubing by the ratcheting mechanism, the second claw being pulled toward the second end being capable of bringing the skin of the small animal therewith while the animal remains hooked onto the first claw.

2. A small game skinning device comprising:

an elongated frame tubing having a first end and a second end;

a short frame tubing being L-shaped, the short frame tubing having an upper end and a back end being positionable over the first end of the elongated frame tubing;

a ratcheting mechanism with a spool being supported above the second end of the elongated frame tubing by a pair of support arms and an axial rod, the spool having a drum being capable of having a heavy-duty cord wound therearound; and a pair of claws forming a first claw and a second claw, the first claw being positionable through the upper end of the short frame tubing by a threaded rod fixedly attached thereto, the second claw having an eyelet for receiving one end of the cord therethrough, the cord having another end being wrapped around the spool, the first claw being hooked onto a part of a small animal while the second claw grapples with the animals back skin, the back skin being pulled away from the animal by pulling the second claw toward the second end of the elongated frame tubing with the ratcheting mechanism.

3. The small game skinning device as set forth in claim 2, wherein the elongated frame tubing having a plurality of mounting ears for attaching the tubing to the work table, the elongated frame tubing having a left side and a right side with each side having two of the mounting ears positionable thereon.

4. The small game skinning device as set forth in claim 3, wherein the mounting ears each being generally rectangular, the two mounting ears of the left side being spaced apart, and the two mounting ears of the right side being spaced apart.

5. The small game skinning device as set forth in claim 2, wherein the short frame tubing being coupled with the elongated frame tubing and capable of extending beyond the work table.

6. The small game skinning device as set forth in claim 2, wherein the pair of support arms having a left support arm being adjacent a ratchet wheel and crank of the ratcheting mechanism, and the pair of supports arms having a right support arm being spaced from a large wheel of the spool and having one end of the axial rod therethrough.

7. The small game skinning device as set forth in claim 2, wherein each claw being three pronged with two large outer J-hook members and one small J-hook member, each J-hook member of each claw facing upwardly.

8. The small game skinning device as set forth in claim 7, wherein the threaded rod of the first claw being locked within the short frame and having the first claw being directed toward the ratcheting mechanism.

9. The small game skinning device as set forth in claim 2, wherein the cord being threaded through the eyelet of the second claw and secured therein by a clamp, and when the second claw being pulled toward the second end to bring the skin the animal remains hooked onto the first claw.

* * * * *